United States Patent [19]
Huang

[11] Patent Number: 5,486,934
[45] Date of Patent: Jan. 23, 1996

[54] POLARIZATION BEAMSPLITTER WITH A SUBSTRATE-MODE HOLOGRAPHIC STRUCTURE

[75] Inventor: Yang-Tung Huang, Hsinchu, Taiwan

[73] Assignee: National Science Council, Taipei, Taiwan

[21] Appl. No.: 198,176

[22] Filed: Feb. 17, 1994

[51] Int. Cl.⁶ .............................. G02B 5/32; G02B 5/30; G02B 5/28; G02B 5/18

[52] U.S. Cl. .............. 359/15; 359/487; 359/488; 359/495; 359/500; 359/569; 359/583; 359/639

[58] Field of Search .............................. 359/15, 487, 488, 359/494, 495, 500, 558, 566, 569, 576, 583, 618, 629, 636, 639

[56] References Cited

U.S. PATENT DOCUMENTS

| | | | |
|---|---|---|---|
| 3,622,220 | 11/1971 | Kogelnik | 359/15 |
| 4,863,224 | 9/1989 | Afian et al. | 359/15 |
| 4,946,253 | 8/1990 | Kostuck | 359/15 |
| 4,993,789 | 2/1991 | Biles et al. | 359/15 |
| 5,085,496 | 2/1992 | Yoshida et al. | 359/569 |
| 5,272,550 | 12/1993 | Dickson et al. | 359/15 |
| 5,331,445 | 7/1994 | Dickson et al. | 359/15 |

Primary Examiner—Ricky D. Shafer
Attorney, Agent, or Firm—Ladas & Parry

[57] ABSTRACT

This polarization beamsplitter with a substrate-mode holographic structure is used to separate the s-polarization beam with p-polarization, and guide two separated beams at directions parallel to each other. The element consists of a pair of substrate-mode gratings with a specific designed diffraction angle and index modulation on a dielectric substrate. Through the input grating the normally incident beam with one polarization has zero diffraction efficiency and directly pass through the substrate; the beam with another polarization is diffracted at an angle exceeding the critical angle, then propagates through the substrate with total internal reflection to the output grating, and normally coupled out of the element. Thus, the beams with two different polarizations are separated, and two beams propagates at direction parallel to each other. The gratings suitable for infrared applications were formed with dichromated gelatin, and recorded by two free-space input beams with shorter wavelength recording technique.

7 Claims, 4 Drawing Sheets

POLARIZATION BEAMSPLITTER WITH A SUBSTRATE-MODE HOLOGRAPHIC STRUCTURE

BACKGROUND OF THE INVENTION

The present invention relates to a polarization-selective elements with a substrate-mode grating pair structure.

Polarization-selective elements have many applications, such as in switching cells of optical multistage networks and in the polarization-sensing device of the optical pickup head for a magneto-optic data storage system. For switching cells, the devices consist of polarization beam splitters and electro-optic half-wave plates, and electric signals are used to control optical signal paths. For the optical head, the polarization-selective element is used to detect the rotation of the polarization of the beam reflected from the magneto-optic disk medium. Conventionally, in FIG. 1, a prior polarization beamsplitter is shown, wherein item 10 is an incident beam and item 13 is a polarization beamsplitter, and numbers 11 and 12 indicate the s-polarized and p-polarized fields, respectively. The prism cube is used as the polarization beam splitting element. In 1990, holographic elements (U.S. Pat. No. 4,946,253) with a high diffraction angle were designed to replace those prism devices.

Referring now to FIG. 2, number 27 refers to the substrate. An input polarization-independent coupling grating 23, a polarization-selective grating 24, an output s-field coupling grating 25 and the output p-field coupling grating 26 are provided. An incident beam 20 with s-polarization and p-polarization fields is diffracted by the input polarization-independent coupling grating 23 in the substrate, then propagates through the substrate to the polarization-selective grating 24 where the s-polarization beam 21 is split from the p-polarization beam 22. These two beams separately propagate through the substrate at angles beyond the critical angle and with total internal reflection to the output s-field coupling grating 25 and output p-field coupling grating 26, and then is normally coupled out with conjugate diffraction at directions parallel to each other. For this transmission-type phase volume hologram, the relation between the diffraction efficiency for an s-polarized field $\eta_s$ and the efficiency for a p-polarized field $\eta_p$ with the same Bragg reconstruction condition depends strongly on the diffraction angle and is expressed as $$\eta_{s,p} = \sin^2 v_{s,p} \quad (1)$$

and the modulation parameters, $v_s$ (s field) and $v_p$ (p field), are given, respectively, as $$v_s = \frac{\pi n_1 d}{\lambda (\cos\Theta_{r2} \cos\Theta_{r1})^{1/2}} \quad (2)$$

$$v_p = v_s \cos(\Theta_{r2} - \Theta_{r1}) \quad (3)$$

where $\lambda$ is the reconstruction wavelength, d is the medium thickness, $n_1$ is the index modulation, and $\Theta_{r1}$ and $\Theta_{r2}$, respectively, are corresponding angles of the reconstruction and diffracted beams in the hologram medium.

From the diffraction efficiency formulas in Eqs. (1)–(3), it can be seen that when the value of $v_s$ is $\pi/2$, then $\eta_s=100\%$, and if the diffraction angle, $|\Theta_{r2}-\Theta_{r1}|$, is also 90°, then $v_p=0$ and $\eta_p=0\%$. In this case, a highly polarization-selective element can be obtained. However, because of the high diffraction angles (90°) this element needs additional input and output couplers to form a complete device. This type of element has been investigated, and a typical structure is shown in FIG. 2. In this configuration, for the polarization-selective grating 24, $\Theta_{r1}=45°$, $\Theta_{r2}=-45°$, and $n_1=0.016$ with the film thickness of 17 μm, we have $\eta_s=100\%$ and $\eta_p=0\%$. For the input polarization-independent coupling grating 23, $\Theta_{r1}=0°$, $\Theta_{r2}=45°$, and $n_1=0.022$, we have $\eta_s=\eta_p=93\%$; for the output s-field coupling grating 25, $\Theta_{r1}=-45°$, $\Theta_{r2}=0°$, and $n_1=0.019$, we have $\eta_s=100\%$; for the output p-field coupling grating 26, $\Theta_{r1}=45°$, $\Theta_{r2}=0°$, and $n_1=0.027$, we have $\eta_p=100\%$.

Theoretically the maximum transmission efficiency for both s and p channels is only 93%. In addition, four different grating angles and index modulation values make the complete component complicated and difficult to fabricate.

A new structure is disclosed having a smaller diffraction angle to perform a highly polarization-selective procedure that provide a higher transmission and efficiency and a much simpler fabrication process.

SUMMARY OF THE INVENTION

It is therefore an object of this invention to provide a compact and lightweight polarization beamsplitter with better flexibility and easier alignment for system applications.

It is therefore another object of this invention to provide a polarization beamsplitter with a smaller diffraction angle to perform a highly polarization-selective procedure.

It is therefore a further object of this invention to provide a polarization beamsplitter having a higher transmission efficiency and a much simpler fabrication process.

In order to achieve these objects, a polarization beamsplitter for performing the function of polarization selection is provided, which comprises: an optically transmissible substrate; an input coupling grating formed on the optically transmissible substrate for separating an input beam into an direction-unchanged linear polarization beam and a first diffracted linear polarization beam, wherein the polarization of the direction-unchanged linear polarization beam is perpendicular to the polarization of the diffracted linear polarization beam; and an output coupling grating formed on the same side as the input coupling grating of the optically transmissible substrate for secondly diffracting the first diffracted linear polarization beam after the first diffracted linear polarization beam propagating through the optically transmissible substrate with total internal reflection and then out of the optically transmissible substrate on the opposite side of the input and output coupling grating with the direction parallel to the direction-unchanged linear polarization beam.

BRIEF DESCRIPTION OF THE DRAWINGS

The present invention will be described in detail with reference to the illustrative examples and the accompany drawings, in which.

DETAILED DESCRIPTION OF THE INVENTION

Figure 3A:
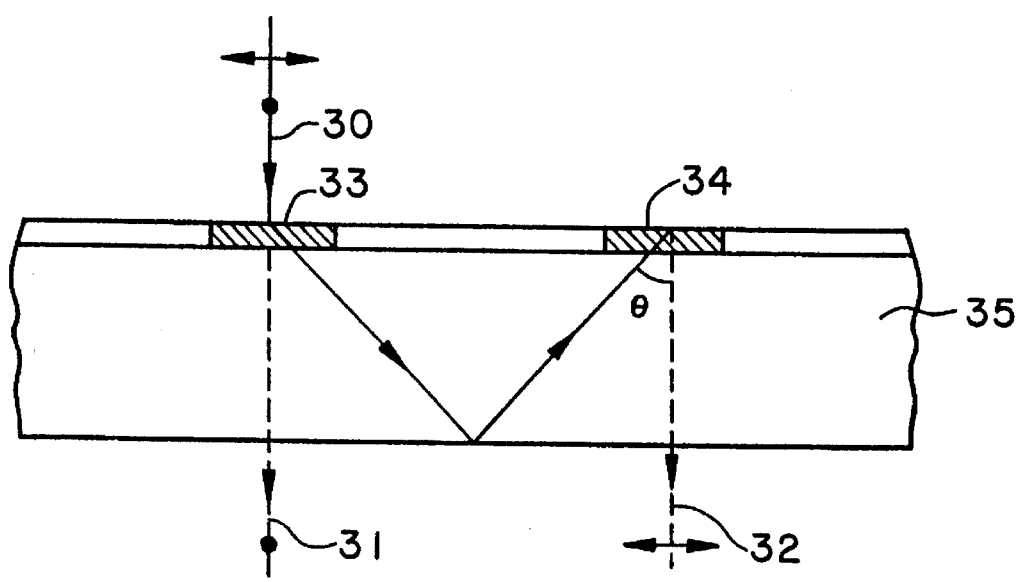
FIGS. 3a and 3b show polarization-selective substrate-mode hologram structures of the claimed invention.

As can be seen in FIG. 3(a), two similar gratings, an input coupling grating 33 and an output coupling grating 34, and formed on an optically transmissible substrate 35. The beam 30 of s-polarized field and p-polarized field and normally incident upon the input coupling grating 33 is separated into two beams, one s-polarization beam 31 and one p-polarization beam 32. The p-polarization beam 32 is diffracted at an angle beyond the critical angle in the substrate, then propagates through the substrate with total internal reflection to the output coupling grating 34, and then is normally coupled out with s-polarization beam 31 which directly pass through the substrate. Thus, the two beams propagates at directions parallel to each other.

Figure 3B:
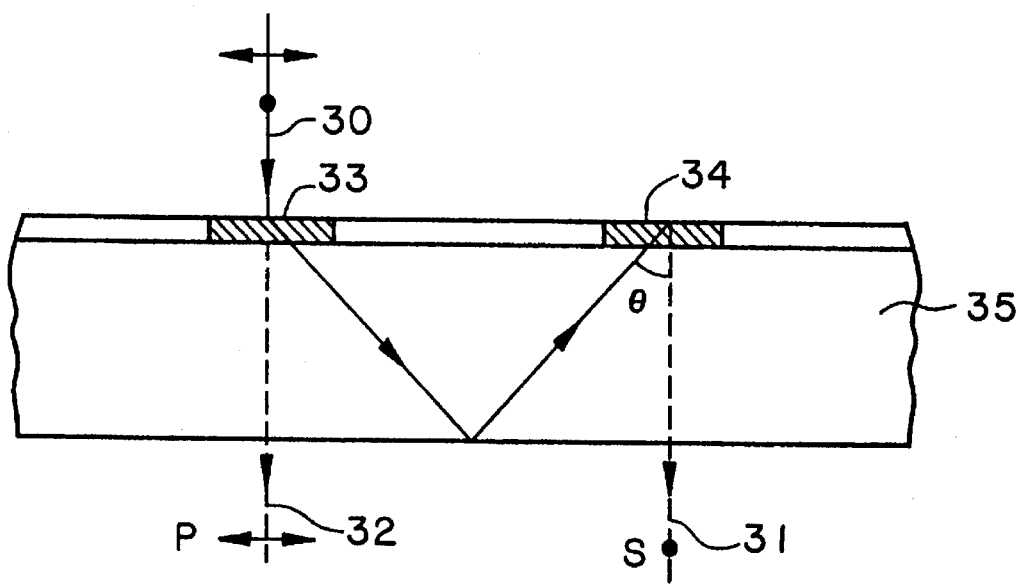

FIG. 3(b) is similar to FIG. 3(a), except the s-polarization beam 31 is diffracted at an angle beyond the critical angle in the substrate. It then propagates through the substrate with total internal reflection to the output coupling grating 34, and then it is normally coupled out with p-polarization beam 32, which directly passes through the substrate.

Figure 2:
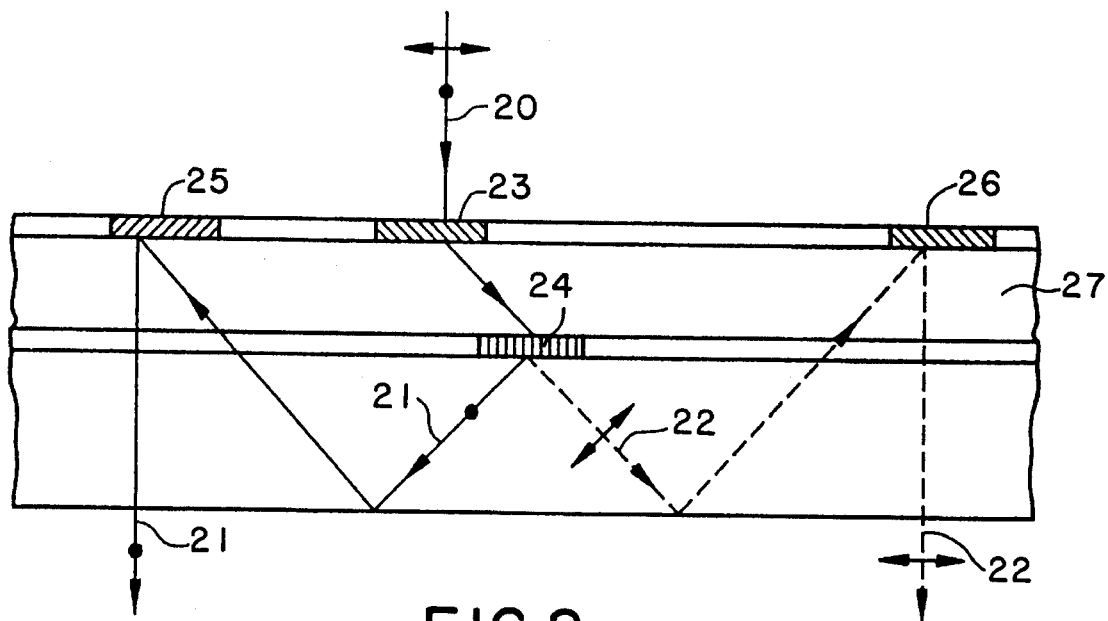
FIG. 2 shows a polarization-selective substrate-mode hologram structure of the prior art.

Compared with the conventional polarization beamsplitter cube, the normally incident output coupling this compact and lightweight component can provide better flexibility and easier alignment for system applications. Two similar gratings formed on a single film need a much simpler fabrication process than the configuration in FIG. 2. With this configuration for input coupling grating 33, the angle of the reconstruction is normal to the substrate-mode, i.e. the $\Theta_{r1}=0°$ and $\Theta_{r2}=\Theta$ for formula (1), (2) and (3), therefore the relation of $\Theta$ and $\eta_s$, $\eta_p$ can be given $$\eta_s = \sin^2 \frac{\pi n_1 d}{\lambda(\cos\Theta)^{1/2}} \quad (4)$$

$$\eta_p = \sin^2 \frac{\pi n_1 d(\cos\Theta)^{1/2}}{\lambda} \quad (5)$$

where $\Theta$ is the angle of the diffracted beams in the hologram medium, d is the film thickness, $n_1$ is the index modulation, and $\lambda$ is the reconstruction wavelength. In our design, if $\eta_s=0\%$ and $\eta_p=100\%$ are desired, $\Theta$ and $n_1d/\lambda$ can be obtained by combining Eqs. (4)–(5), i.e., $\Theta=60.0°$, $n_1d/\lambda=0.707$ or when $\Theta=41.4°$, $n_1d/\lambda=1.73$. In the other hand, when $\Theta=48.2°$, $n_1d/\lambda=1.22$, $\eta_s=100\%$ and $\eta_p=0\%$ can be reached. As the three angles, i.e., 41.4°, 48.2° and 60.0° all exceed the critical angle (40°) of total internal reflection, the beams propagate through the substrate with total reflection to the output grating, and normally coupled out of the element. Therefore, when a suitable grating angle and index modulation are designed, a highly polarization-selective element can be obtained.

Figure 1:
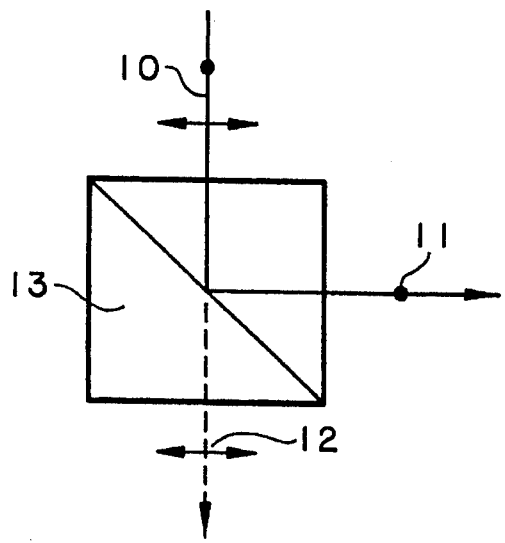
FIG. 1 shows conventional polarization beamsplitter cube.
Figure 4:
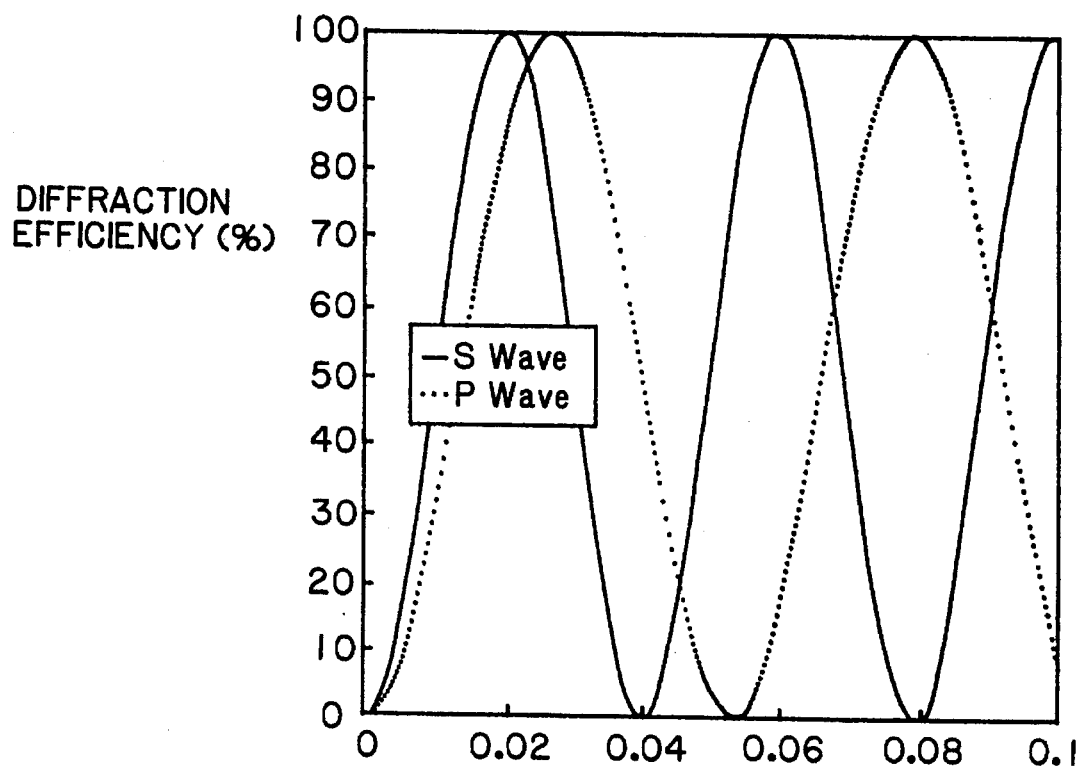
FIG. 4 shows calculated diffraction efficiencies for s- and p-polarization fields, $\eta_s$ and $\eta_p$, versus the index modulation $n_1$.

For input coupler 33, the diffraction beam angle $\Theta$ can be set to be $\Theta=41.4°$. That is, for the output coupling grating 34, $\Theta=41.4°$ ($\Theta_{r2}=0°$). In present embodiments, the operating wavelength is 780 nm in the case of GaAlAs laser diode. The calculated diffraction efficiencies for s- and p-polarized fields verses the index modulation $n_1$ for a film thickness of 17 μm are illustrated in FIG. 4. It is shown that $\eta_s=0°$ and $\eta_p=100\%$ when $n_1=0.008$, which gives the desired polarization-selective property. The index modulation value can be achieved by use of dichromated gelatin. In addition to the much simpler fabrication process, the ideal transmission efficiency of 100% for this invention is also greater than the 93% for the configuration shown in FIG. 1.

Our polarization-selective device was formed in dichromated gelatin prepared from a Kodak 649F photographic plate by the simplified procedure described by Georgekutty and Liu[1]. With a shorter-wavelength recording technique, this component was recorded at 488-nm wavelength with two free-space input beams for substrate-mode operation at 780 nm. The device was fabricated with $\eta_s=1.2\%$ and $\eta_p=90.2\%$, which verified the property of a high degree of polarization selection.

In summary, a novel structure of a substrate-mode hologram has been presented, and the design has been discussed for highly polarization-selective application. Normally incident and output coupling with this compact and lightweight device provides better flexibility and easier alignment for a system setup. The device has been fabricated for 780-nm operation. Polarization-sensitive switching experiments with this device have also been demonstrated.

In order to further confirm the advantage of this invention, the following experiment is designed to verify the claimed invention with more efficient and convenient function.

DETAILED DESCRIPTION OF THE PREFERRED EMBODIMENTS

Figure 5:
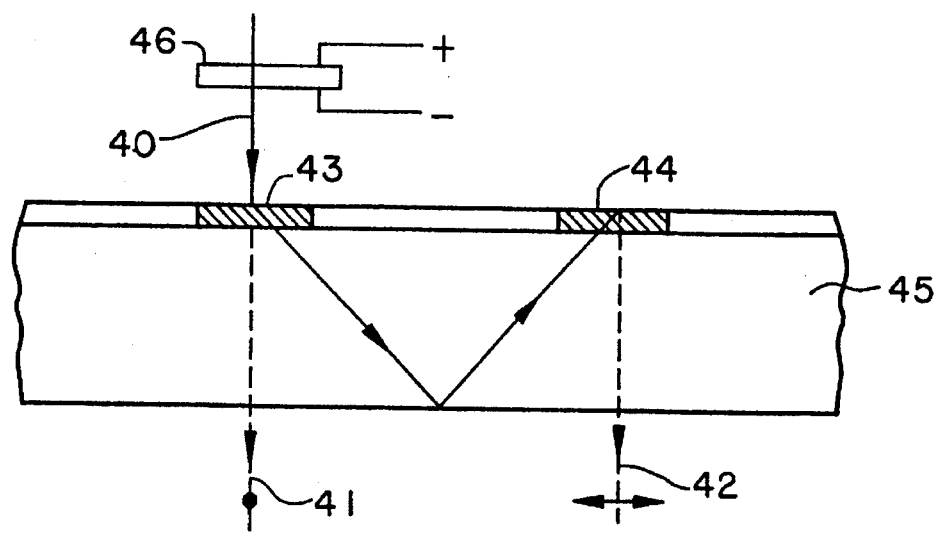
FIG. 5 shows the experimental configuration of polarization-selective switching.
Figure 6A:
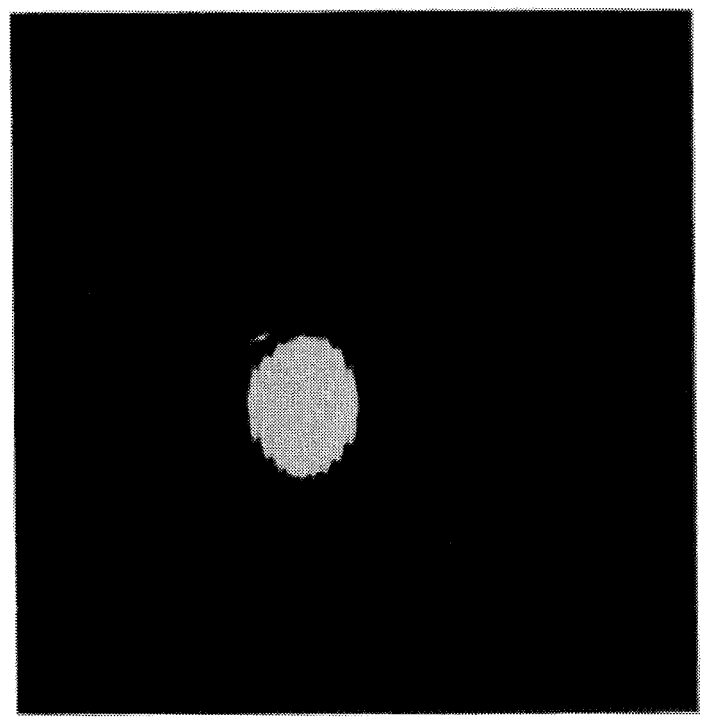
FIGS. 6(a) and 6(b) show the transmission images for polarization-selective switching experiments: (a) s field, (b) p field.
Figure 6B:
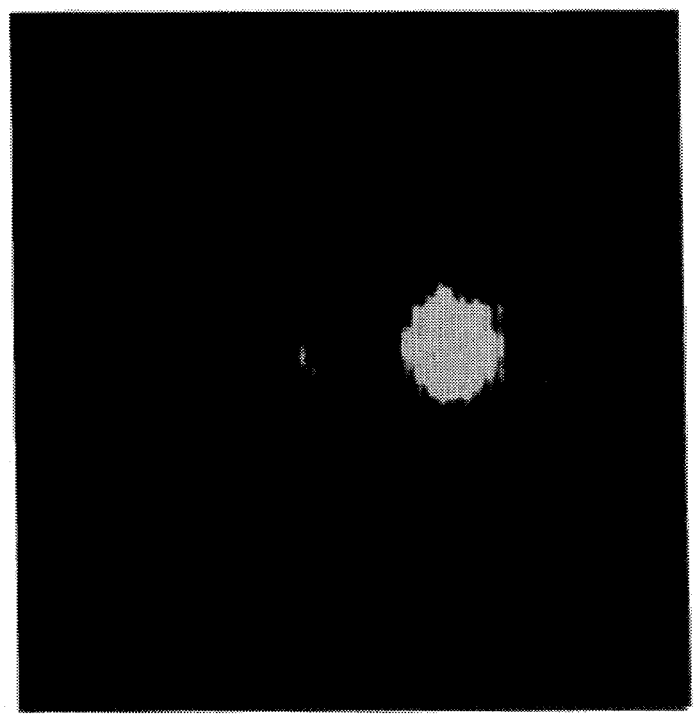

In order to further test the function of the beamsplitter, a switching experiment was performed. Our polarization-selective substrate-mode element (the substrate thickness= 17 μm, the reconstruction beam angle $\Theta_{r1}=0°$, the diffraction angle $\Theta_{r2}=41.4°$, and index modulation $n_1=0.08$) was used in conjugation with a ferroelectric liquid crystal (FLC) at the input to control the state of the field polarization. In FIG. 5, after the beam 40 passes through the FLC and normally incident upon the input coupling grating 43, the beam was separated into two beams: one-direction polarization beam 41 and one other-direction polarization beam 42. The one-direction polarization beam 42 was diffracted at an angle beyond the critical angle in the substrate 45, then propagates through the substrate 45 with total internal reflection to the output coupling grating 44, and then was normally coupled out with the other-direction polarization beam 41 which directly pass through the substrate 45. Thus, the two beams propagates at direction parallel to each other. FIGS. 6(a) and 6(b) respectively show the transmission images of s and p fields from the configuration in FIG. 5. The FLC device was a model PV050-780 from Display, Inc. This FLC was controlled by the state of the electric input voltage to determine the input beam polarization state. The result demonstrates polarization-selective switching with our device. To enhance the selection contrast, the construction setup and the fabrication process must be more precisely controlled. However, this grating pair structure automatically provides a good way to meet the high contrast requirement. With contrast of a value greater than 30 for one grating ($\eta_p \geq 90\%$ and $\eta_s \leq 3\%$, and transmission $T_s \geq 90\%$ and $T_p \leq 3\%$), the output contrast of the coupled channel (p field) from the pair was higher than 90%. With one more grating on the transmission output side, the output contrast for the s field was also higher than 90%. Therefore the process control requirement was greatly reduced.

While the invention has been described by way of example and in terms of several preferred embodiments, it is to be understood the invention need not be limited to the disclosed embodiment. On the contrary, it is intended to cover various modifications and similar arrangements included within the spirit and scope of the appended claims, the scope of which should be accorded the broadest interpretation so as to encompass all such modification and similar structures.

Reference: T. G. Georgekutty and H. -K. Liu, Appl. Opt. 26, 372 (1987)

What is claimed is:

1. A polarization beamsplitter for performing the function of polarization selection, comprising:

an optically transmissible substrate;

an input coupling grating formed on a first side of said optically transmissible substrate for separating an input beam, having an input beam wavelength, into an direction-unchanged linear polarization beam and a first diffracted linear polarization beam, wherein the polarization of said direction-unchanged linear polarization beam is perpendicular to the polarization of said diffracted linear polarization beam, said direction-unchanged linear polarization beam and said first diffracted linear polarization beam having a first diffraction angle therebetween, said input coupling grating having an input coupling grating film thickness and an input coupling grating index modulation; and an output coupling grating formed on said first side of said optically transmissible substrate for diffracting said first diffracted linear polarization beam to become a secondly diffracted linear polarization beam after said first diffracted linear polarization beam has propagated through said optically transmissible substrate followed by internal reflecting, said secondly diffracted linear polarization beam and said first diffracted linear polarization beam after said internal reflecting having a second diffraction angle therebetween, said output coupling grating having an output grating film thickness and an output grating index modulation, wherein the input coupling grating index modulation, the output coupling grating index modulation, the input coupling grating film thickness, the output coupling grating film thickness and the input beam wavelength are selected such that said first diffraction angle and said second diffraction angle are selected from the group consisting of 48.2°, 41.1° and 60.0°, and said secondly diffracted linear polarization beam being transmitted out of said optically transmissible substrate on an opposite side of said first side of said optically transmissible substrate with a direction parallel to said direction-unchanged linear polarization beam.

2. The polarization beamsplitter as claimed in claim 1, wherein said direction-unchanged linear polarization beam is a p-polarization beam and the secondly diffracted linear polarization beam is a s-polarization beam.

3. The polarization beamsplitter as claimed in claim 2, wherein the input coupling grating index modulation, the output coupling grating index modulation, the input coupling grating film thickness, the output coupling grating film thickness and the input beam wavelength are selected such that said first diffraction angle and said second diffraction angle, said secondly diffracted linear polarization beam being s-polarization, are 48.2°.

4. The polarization beamsplitter as claimed in claim 1, wherein the input coupling grating index modulation, the output coupling grating index modulation, the input coupling grating film thickness, the output coupling grating film thickness and the input beam wavelength are selected such that said direction-unchanged linear polarization beam and said secondly diffracted linear polarization beam are normally coupled out of said polarization beamsplitter when said input beam is normally incident into said polarization beamsplitter.

5. The polarization beamsplitter as claimed in claim 1, wherein said direction-unchanged linear polarization beam is an s-polarization beam and the secondly diffracted linear polarization beam is a p-polarization beam.

6. The polarization beamsplitter as claimed in claim 5, wherein the input coupling grating index modulation, the output coupling grating index modulation, the input coupling grating film thickness, the output coupling grating film thickness and the input beam wavelength are selected such that said first diffraction angle and said second diffraction angle, said secondly diffracted linear polarization beam being p-polarization, are selected from the group consisting of 41.4° and 60.°.

7. The polarization beamsplitter as claimed in claim 6, wherein the input beam wavelength is 780 nm, the medium thicknesses of said input coupling grating film thickness and said output coupling grating film thickness are 17 μm, the input coupling grating index modulation and the output coupling grating index modulation are each 0.08 and said first diffraction angle and said second diffraction angle are 41.4°.

* * * * *